United States Patent
Baftiu et al.

(10) Patent No.: US 9,995,822 B2
(45) Date of Patent: Jun. 12, 2018

(54) INTEGRATION OF A RADAR SENSOR IN A VEHICLE

(71) Applicant: Continental Automotive Systems, Inc., Auburn Hills, MI (US)

(72) Inventors: Irfan Baftiu, Shelby Township, MI (US); Frank Gruson, Lindau (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 354 days.

(21) Appl. No.: 14/304,031

(22) Filed: Jun. 13, 2014

(65) Prior Publication Data

US 2014/0368375 A1 Dec. 18, 2014

Related U.S. Application Data

(60) Provisional application No. 61/834,558, filed on Jun. 13, 2013.

(51) Int. Cl.
*G01S 13/93* (2006.01)
*H01Q 17/00* (2006.01)
*G01S 7/02* (2006.01)

(52) U.S. Cl.
CPC ........... *G01S 13/931* (2013.01); *H01Q 17/00* (2013.01); *G01S 2007/027* (2013.01); *G01S 2013/9389* (2013.01)

(58) Field of Classification Search
CPC ............................................. G01S 2013/9371
See application file for complete search history.

(56) References Cited

U.S. PATENT DOCUMENTS

| | | | | |
|---|---|---|---|---|
| 5,110,651 A | * | 5/1992 | Massard | H01Q 15/24 174/394 |
| 5,558,919 A | * | 9/1996 | Toni | B29D 24/007 428/116 |
| 5,955,752 A | * | 9/1999 | Fukaya | G01S 7/032 257/275 |
| 6,075,492 A | * | 6/2000 | Schmidt | H01Q 1/3233 343/753 |
| 6,366,245 B1 | * | 4/2002 | Schmidt | G01S 7/032 343/700 MS |
| 6,489,927 B2 | * | 12/2002 | LeBlanc | B60K 31/0008 342/198 |
| 6,496,138 B1 | * | 12/2002 | Honma | G01S 13/931 342/27 |
| 7,009,106 B2 | * | 3/2006 | DiPoala | H05K 9/0056 174/377 |
| 7,009,551 B1 | * | 3/2006 | Sapletal | G01S 7/025 342/70 |
| 7,119,735 B2 | * | 10/2006 | Hirose | G01S 7/038 342/159 |
| 7,482,990 B2 | * | 1/2009 | Fujii | H01Q 1/3233 343/713 |

(Continued)

FOREIGN PATENT DOCUMENTS

JP        2010014358 A   *  1/2010

*Primary Examiner* — Matthew M Barker

(57) ABSTRACT

A disclosed collision detection system for a vehicle includes a radar sensor mounted to the vehicle proximate that is capable of detecting objects in proximity to the vehicle, and at least one component at least partially defining a cavity. The cavity is at least partially filled by a material that modifies a portion of radar energy emitted from the radar sensor and transmitted back to the radar sensor.

11 Claims, 3 Drawing Sheets

(56) References Cited

U.S. PATENT DOCUMENTS

| | | | |
|---|---|---|---|
| 7,980,606 B2* | 7/2011 | Takahashi | B60R 21/0136 293/117 |
| 8,047,587 B2* | 11/2011 | Sawai | B60R 19/26 293/117 |
| 8,744,743 B2* | 6/2014 | Kawasaki | B60R 19/483 180/68.1 |
| 8,864,197 B2* | 10/2014 | Schneider | H01Q 1/3233 293/117 |
| 2001/0026237 A1* | 10/2001 | Okai | H01Q 1/405 342/70 |
| 2004/0227663 A1* | 11/2004 | Suzuki | G01S 7/03 342/70 |
| 2005/0001757 A1* | 1/2005 | Shinoda | H01Q 1/3233 342/70 |
| 2006/0238404 A1* | 10/2006 | Ikeda | G01S 7/032 342/70 |
| 2007/0241962 A1* | 10/2007 | Shinoda | G01S 7/032 342/361 |
| 2011/0068619 A1* | 3/2011 | Werner | B22D 19/00 301/127 |
| 2014/0070982 A1* | 3/2014 | Inada | B60R 19/483 342/188 |
| 2014/0375490 A1* | 12/2014 | Pfitzenmaier | G01S 7/032 342/4 |
| 2015/0022389 A1* | 1/2015 | Binzer | G01S 13/931 342/1 |
| 2016/0001723 A1* | 1/2016 | Oku | B60R 19/03 293/121 |
| 2016/0023624 A1* | 1/2016 | Schaaf | B60R 19/03 293/117 |
| 2016/0033621 A1* | 2/2016 | Ottenhues | G01S 7/032 342/175 |

\* cited by examiner

INTEGRATION OF A RADAR SENSOR IN A VEHICLE

CROSS REFERENCE TO RELATED APPLICATION

This application claims priority to U.S. Provisional Application No. 61/834,558 filed on Jun. 13, 2013.

BACKGROUND

Vehicles are equipped with radars sensor designed to monitor objects in the radar sensors field of view (FOV) by receiving power and frequency of its own transmitted radar energy. Close reflections of the radar energy (e.g. from the bumper & chassis of the vehicle) are recognized as parasitic reflections and are filtered out. However, problems arise, if the reflected radar energy enters cavities inside the car, such as (but not limited to) chassis parts, venting hoses a metallic crash beams. These types of cavities act as waveguides, effectively carrying and delaying radar signals. If such radar signals are reflected back through such a cavity, they may present a ghost target to the sensor at a distance of several meters. This is the regular operation region of the radar and as such, the radar sensor is most sensitive here.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A disclosed collision detection system for a vehicle includes a radar sensor mounted to the vehicle that is capable of detecting objects in proximity to the vehicle, and at least one component at least partially defining a cavity. The cavity is at least partially filled by a material that modifies a portion of radar energy emitted from the radar sensor and transmitted back to the radar sensor. In one disclosed embodiment the material that fills the cavity is one of a radar energy absorptive material and a radar energy reflecting material. In another disclosed embodiment the at least one cavity includes two cavities with a first cavity including a radar absorptive material and a second cavity including a radar reflective material.

The different radar energy modifying materials reduce ghost target clusters caused by multipath reflections in cavities without deteriorating the performance of the radar sensors.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
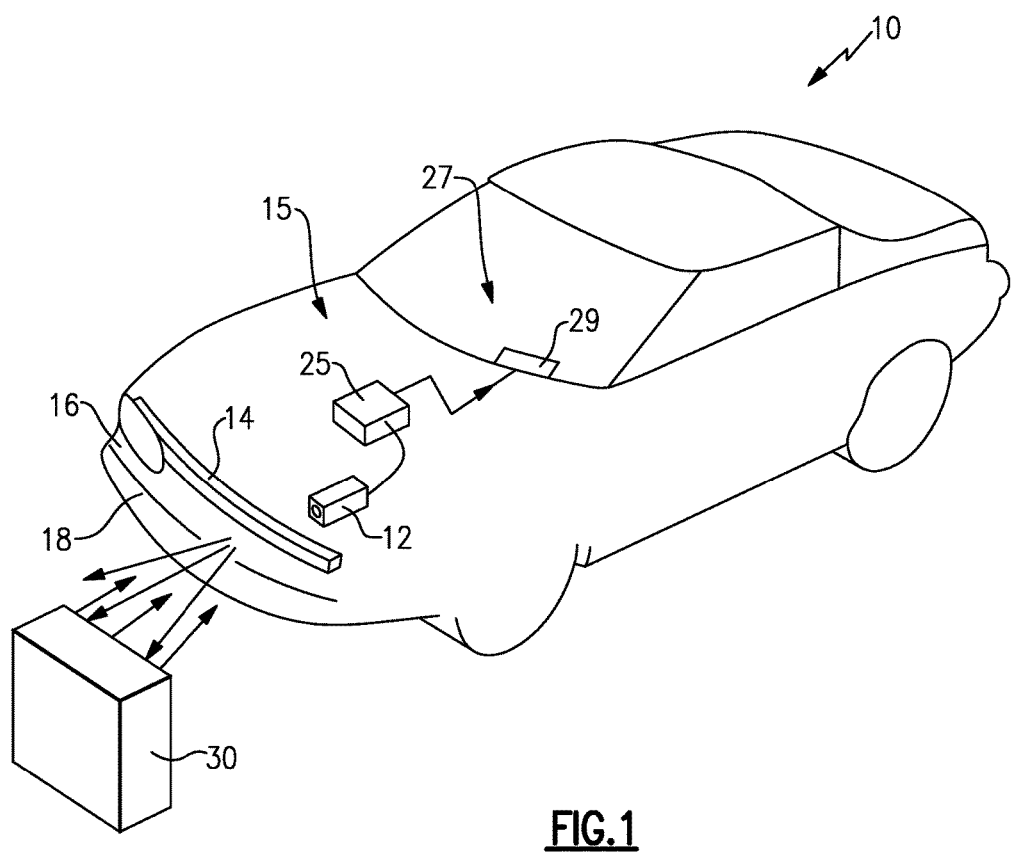
FIG. 1 is a schematic view of an example vehicle including a collision detection system.

The following description is merely exemplary in nature and is in no way intended to limit the disclosure, its application, or uses. For purposes of clarity, the same reference numbers will be used in the drawings to identify similar elements.

Referring to FIG. 1, an example vehicle 10 includes a collision detection system 15 including a sensor 12 that communicates information to a controller 25. The controller 25 processes information received from the sensor 12 and in turn communicates that information to an operator by way of a warning device 29 disposed within the vehicle cabin 27. The warning device may 29 be a light, audible signal or combination of signals to alert an operator of objects proximate the vehicle 10.

In this example, the sensor is a radar sensor 12 mounted behind a crash beam 14 of the vehicle 10. The radar sensor 12 may be a short range radar sensor 12 for detecting objects that are proximate to the vehicle 10. The field of view for the radar sensor 12 may be designed to target the desired detection area to determine proximity of the vehicle 10 to an object 30. Although a radar sensor 12 is disclosed by way of example, other sensors that emit energy to obtain information on surrounding objects would benefit from this disclosure.

Figure 2:
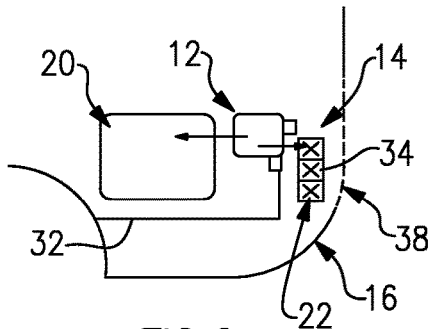
FIG. 2 schematic view of a collision detection system.
Figure 3:
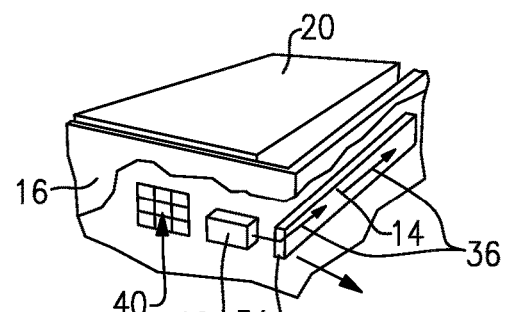
FIG. 3 is a perspective view of the example collision detection system including a sensor mounted within the vehicle.

Referring to FIG. 2 with continued reference to FIG. 1, radar sensors operate at various frequencies (including but not limited to 24 and 76 GHz systems) and are mounted behind painted bumpers or vehicle fascia panels 16. The vehicle facia panels 16 may include special radomes or secondary surfaces 38. The radome 38 is a dielectric material with a relative dielectric constant above "1". The dielectric constant of "1" is the dielectric constant of air. Accordingly, electromagnetic radar energy waves schematically shown at 36 (not numbered in FIG. 1) are transmitted through the radome 38. A portion of the transmitted radar energy 36 is reflected back towards sensor 12 and chassis 32 and utilized to determine the location of surrounding objects. A portion of the transmitted energy is also absorbed by external objects and portions of the vehicle 10.

Reflection of radar energy 36 due to components of the vehicle 10 reduces accuracy of the sensor 12. Techniques exist to minimize reflection and thus maximize transmission such as thickness matching and optimum choice of radar polarization. However, even for optimized structures, around 1-10% of the radar energy 36 is reflected by vehicle structures, such as the crash beam 14 and air vent 20. The performance of the radar sensor 12 is deteriorated if the root cause of the multiple reflections is not removed. Moreover, the multiple reflections can generate a ghost object due to multiple reflections from close objects and structures. The ghost object generated by the multipath refection can be blinded (skipped) or otherwise addressed by the controller 25 using signal processing techniques. However, such techniques can reduce the accuracy of the collision detection system 15.

The crash beam 14 is located behind the fascia 16 for the vehicle 10 and is located proximate to the bumper 18 (shown in FIG. 1). In the embodiment shown, an air vent 20 is also located proximate to the sensor 12. The example crash beam 14 is a hollow member that includes cavity 34. The air vent 20 is also a substantially hollow member including a cavity 40.

The radar sensor 12 is located behind the crash beam 14 and proximate to the bumper 18 and the air vent 20. The radar sensor 12 may be located at other areas of the vehicle 10 and may be proximate to other structures that include cavities besides the crash beam 14, the bumper 18 and the air vent 20. The example collision detection system 15 includes features for reducing the effects that cavities have on information obtained by the radar sensor 12.

Figure 5A:
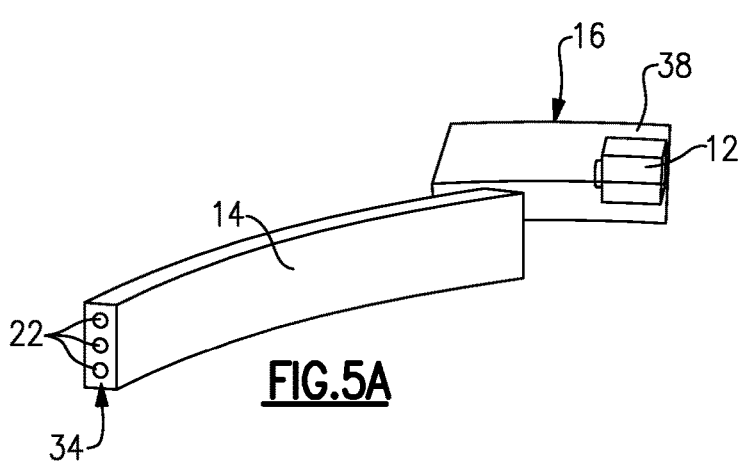
FIG. 5A is a backside view of the crash beam and part of the vehicle fascia and sensor including radar absorptive material.
Figure 5B:
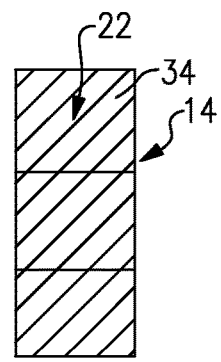
FIG. 5B is a schematic view of the example crash beam filled with radar absorptive material.

Referring to FIGS. 5A and 5B with continued reference to FIG. 2, a disclosed embodiment of the collision detection system 15 includes the cavity 34 of the crash beam 14 in the vicinity of the radar sensor 12 and the cavity 40 in the air vent 20 that are closed to radar energy 36. The cavity 34 (best shown in FIG. 5B) in this example is filled, fully or partially, with a material 22, which has absorptive properties at radar frequencies matching those emitted by the sensor 12. The absorptive material 22 may be of carbon, graphite or iron-loaded foam.

Figure 4:
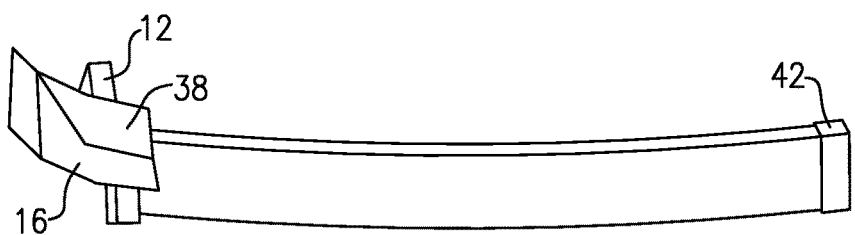
FIG. 4 is an exterior view of the crash beam and part of the vehicle fascia proximate to the sensor.

The absorptive material 22 may be of solid or meshed plastic formed as caps 42 (FIG. 4) by injection moldable plastic. The material 22 may be formed by injection moldable plastic, e.g. nylon with radar-absorptive filler. The material 22 may be a Polyamide with glass re-enforcement and absorptive filler, such as Grilamid® LV-3 X ESD.

For structures where the cavity cannot be closed such as for example the cavity 40 of the air vent 20, the material forming the air vent is provided as radar absorptive material 22 formed as a meshed plastic. Such a material is utilized for structures of the collision detection system 15, and near the collision detection system 15 that cannot be closed as it would restrict the function of the cavity. In this example, the air vent 20 is constructed of such meshed plastic absorptive material 22; however other structures such as ventilation hoses, and air vents from the inside of the car to the outside could be fabricated with radar absorptive material to prevent the reflection of radar energy 36.

Figure 6:
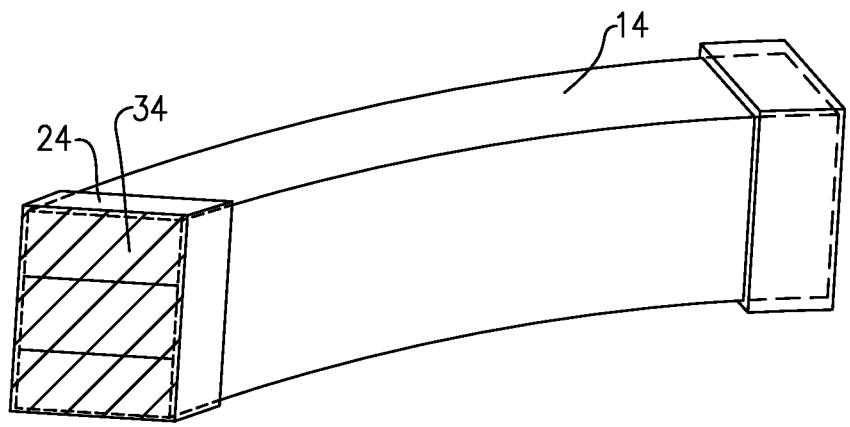
FIG. 6 is a schematic view of an example crash beam including radar absorptive material.

Referring to FIG. 6, in another embodiment a structure such as the crash beam 14 that includes a cavity 34 in the vicinity of the radar sensor 12 shall be closed (fully or in form of a mesh) by a material 24 which has reflective properties, such as metal or conductive (e.g. but not limited to antistatic) plastic. The reflective properties provided by the material 24 reflect radar energy 36 and prevent redirection that is induced by the cavity 34.

Figure 7:
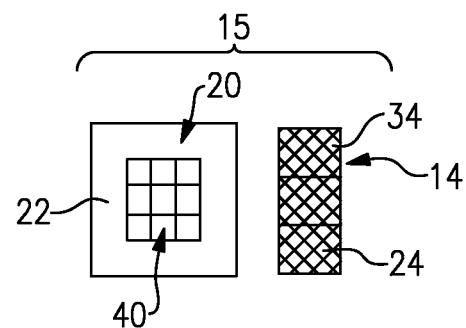
FIG. 7 is a schematic view of an example collision detection system that includes structures including radar absorptive material and structures including radar reflective materials.

Referring to FIG. 7, in another embodiment, the cavities 34 and 40 or only some of the cavities 34, 40 may be at least partially filled, or closed, with the material 22, 24 which are absorptive or reflective or some combination thereof. In this example, the absorptive material 22 is associated with the cavity 40 in the air vent 20 and the reflective material 24 is associated with the cavity 34 in the crash beam. The combination of absorptive material 22 and reflective material 24 depend on the characteristics of that particular cavity in reflecting the radar energy and the material 22, 24 which would best reduce the ghost signals recorded by the radar sensors 12. The location, amount and type of material 22, 24 best suited for a particular radar sensor(s) 12 and cavity 34, 40 arrangements is structure dependent and may vary within the contemplation of this disclosure.

Therefore, the problem of ghost target clusters due to multipath reflections in cavities is solved in a simple, inexpensive way and without deteriorating the performance of the radar sensors 12. A cause of sensor inaccuracy is effectively eliminated and a design guideline is given to avoid problems with multipath reflections in a very generic way.

Application can be in automotive, avionic, naval and industrial applications, i.e. all applications where the sensor 12 is mounted behind radome 38.

While the best modes for carrying out the invention have been described in detail the true scope of the disclosure should not be so limited, since those familiar with the art to which this invention relates will recognize various alternative designs and embodiments for practicing the invention within the scope of the appended claims.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A collision detection system for a vehicle comprising:
a crash beam extending between opposite ends and defining a cavity and an opening to the cavity at one of the ends;
a radar sensor mounted behind the crash beam, wherein the radar sensor is capable of detecting objects in proximity to the vehicle;
wherein the cavity of the crash beam is at least partially filled with a material that modifies radar energy emitted from the radar sensor and radar energy transmitted to the radar sensor; and
a cap completely covering the opening to the cavity, the cap comprising at least one of a radar absorptive material and a radar reflective material;
wherein the cap is nylon filled with radar-absorptive filler.

2. The collision detection system as recited in claim 1, wherein the material at least partially filling the cavity of the crash beam includes radar energy absorptive properties at radar frequencies produced by the radar sensor.

3. The collision detection system as recited in claim 1, wherein the material at least partially filling the cavity of the crash beam comprises radar energy reflecting properties.

4. The collision detection system as recited in claim 1, wherein the material at least partially filling the cavity of crash beam has radar absorptive properties and wherein the system further comprises another component having a cavity at least partially filled with a material having radar reflective properties.

5. The collision detection system as recited in claim 1, including a controller for generating an alert signal responsive to signals from the radar sensor.

6. A motor vehicle comprising:
a collision detection system including a radar sensor emitting radar energy and capable of detecting objects proximate to the vehicle;
a radar energy transparent material defining a portion of a vehicle fascia proximate the radar sensor;

a crash beam extending between opposite ends and defining a cavity and an opening to the cavity at one of the ends and disposed in front of the radar sensor, wherein the cavity is at least partially filled by a material that modifies a portion of radar energy emitted from the radar sensor and radar energy transmitted to the radar sensor; and a cap completely covering the opening to the cavity, the cap comprising at least one of a radar absorptive material and a radar reflective material;

wherein the cap is nylon filled with radar-absorptive filler.

7. The motor vehicle as recited in claim 6, wherein the material at least partially filling the cavity of the crash beam includes radar energy absorptive properties at radar frequencies produced by the radar sensor.

8. The motor vehicle as recited in claim 6, wherein the material at least partially filling the cavity of the crash beam comprises radar energy reflecting properties.

9. The vehicle as recited in claim 6, wherein the material at least partially filling the cavity of the crash beam has radar absorptive properties and wherein the vehicle further comprises another component having a cavity at least partially filled with a material having radar reflective properties.

10. The collision detection system as recited in claim 6, including a controller for generating an alert signal responsive to signals from the radar sensor.

11. A collision detection system for a vehicle comprising:
a crash beam extending between opposite ends and defining a cavity and an opening to the cavity at one of the ends;

a radar sensor mounted behind the crash beam, wherein the radar sensor is capable of detecting objects in proximity to the vehicle;

wherein the cavity of the crash beam is at least partially filled with a material that modifies radar energy emitted from the radar sensor and radar energy transmitted to the radar sensor; and a cap completely covering the opening to the cavity, the cap comprising at least one of a radar absorptive material and a radar reflective material;

wherein the cap is formed from Polyamide with glass re-enforcement.

* * * * *